United States Patent
Wetzel

Patent Number: 6,117,202
Date of Patent: Sep. 12, 2000

[54] GASKET SEAL FOR FILTER UNIT

[75] Inventor: Lawrence E. Wetzel, Cazenovia, N.Y.

[73] Assignee: Floratech Industries, Inc., Syracuse, N.Y.

[21] Appl. No.: 09/273,377

[22] Filed: Mar. 22, 1999

Related U.S. Application Data

[60] Provisional application No. 60/079,561, Mar. 27, 1998.

[51] Int. Cl.$^7$ .................................................. B01D 46/52
[52] U.S. Cl. ............................. 55/385.2; 55/355; 55/502; 55/508; 454/187
[58] Field of Search ................................. 55/385.1, 385.2, 55/355, 483, 484, 502, 508; 454/187

[56] References Cited

U.S. PATENT DOCUMENTS

| | | | |
|---|---|---|---|
| 3,999,969 | 12/1976 | Shuler | 55/508 |
| 4,518,405 | 5/1985 | Lough et al. | 55/385.2 |
| 4,601,737 | 7/1986 | Gerbig | 55/508 |
| 4,724,749 | 2/1988 | Hedrick | 55/385.2 |
| 4,883,511 | 11/1989 | Gustin et al. | 55/508 |
| 4,946,484 | 8/1990 | Monson et al. | 55/385.2 |
| 5,102,437 | 4/1992 | Hirayama | 55/508 |
| 5,279,632 | 1/1994 | Decker et al. | 55/385.2 |
| 5,540,867 | 7/1996 | PeBello | 55/508 |
| 5,601,626 | 2/1997 | Hori et al. | 55/508 |
| 5,733,348 | 3/1998 | Skarsten | 55/502 |
| 5,795,361 | 8/1998 | Lanier, Jr. et al. | 55/502 |
| 5,837,040 | 11/1998 | Caughron et al. | 55/385.1 |
| 6,027,542 | 2/2000 | Brandhofer et al. | 55/508 |

*Primary Examiner*—David A. Simmons
*Assistant Examiner*—Minh-Chau T. Pham
*Attorney, Agent, or Firm*—Trapani & Molldrem

[57] ABSTRACT

A filter and frame arrangement, e.g., a HEPA type filter/blower unit, has an arrangement for sealing the filter in place to prevent contaminants from leaking around the filter. A secondary seal, e.g., in the form of a gasket, both holds the filter in place in the unit and also seals the space between the primary seal (e.g., gel seal) and the clean space. An extruded gasket seats into a peripheral recess in the frame. This can be removed when the filter needs to be changed out so the filter can be taken out from below and replaced. Then a replacement seal is installed after the new HEPA filter is in position. The gasket seal is as close as possible to the bottom of the frame, i.e., as close to the clean space, so that possible contaminants are prevented from falling into the space below. Instead of an elastomeric gasket, a spring metal gasket can be used, with caulking.

11 Claims, 2 Drawing Sheets

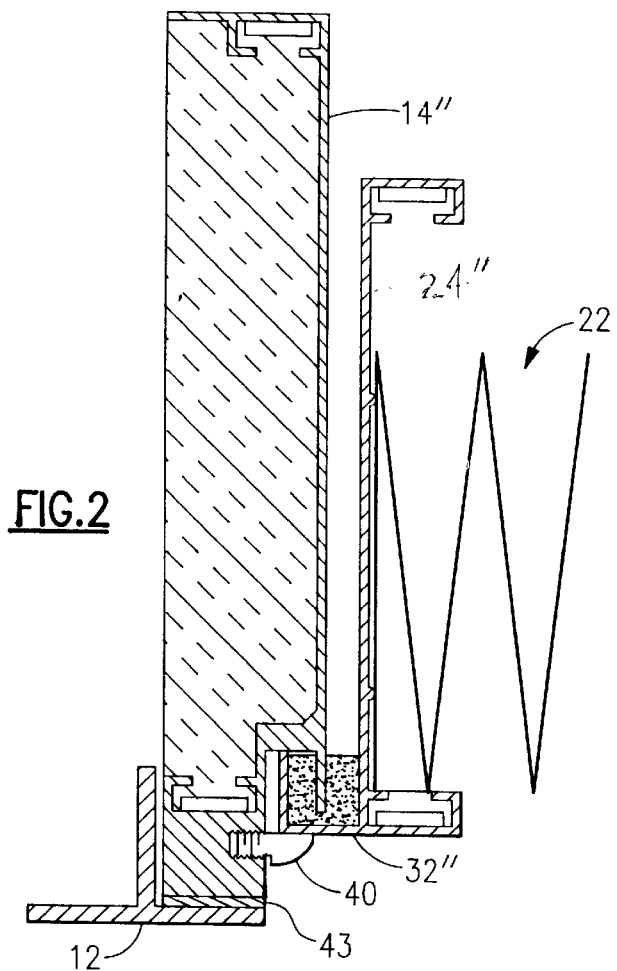
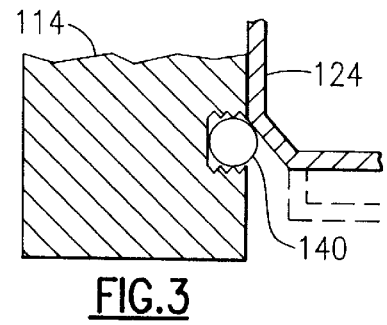
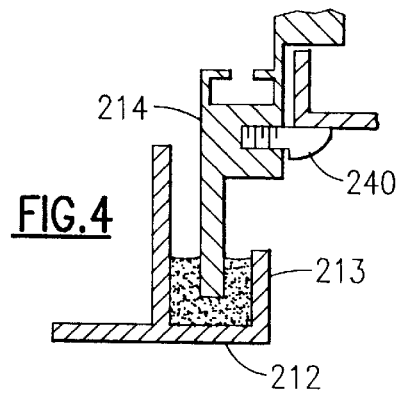
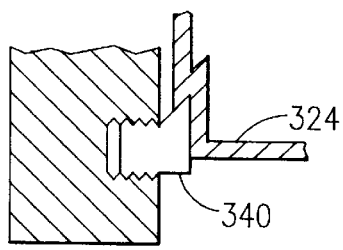
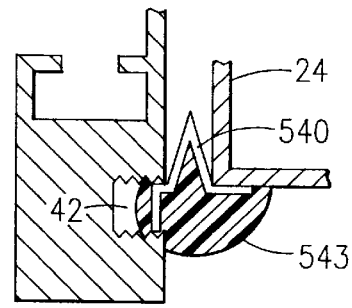
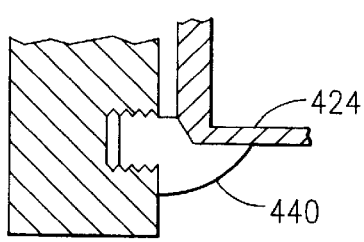
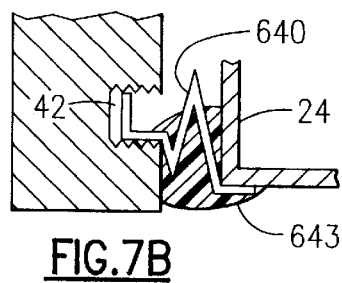

GASKET SEAL FOR FILTER UNIT

This application claims priority of my copending Provisional Patent Appln. Ser. No. 60/079,561, filed Mar. 27, 1998, and which is incorporated herein by reference.

BACKGROUND OF THE INVENTION

The invention concerns a filter and frame arrangement, e.g., a HEPA type filter unit, and is particularly directed to the arrangement for sealing the filter in place to prevent contaminants from leaking around the filter. The invention here concerns an arrangement that both holds the filter in place in the unit and also seals the space between the unit's primary seal (e.g., gel seal) and the clean space.

High Efficiency Particulate Air (HEPA) filters are used extensively in industrial, commercial and residential applications to filter out dust and dirt from the air which can harbor harmful bacteria or other micro-organisms. These filters are capable of filtering out more than 99.99% of the particles in the air. One of the drawbacks to the HEPA filter is its high airflow pressure drop, especially as the filter starts to load up. Because of this, the air would prefer to bypass the filter as it always takes the path of least resistance. Since normal ambient air contains millions of particles per cubic foot, even the smallest leak will cause thousands of particles per minute to bypass the filter. Because these filters are used in critical applications, any leak can therefore result in grave harm to the people or product the filter is intended to protect. The filters become loaded up over time, and they have to be replaced periodically. This generally means that they have to be mounted into some sort of holding frame or conduit within the airstream. The sealing of these filters therefore becomes critical.

Most HEPA filters are held in place by any of various mechanical fasteners, which hold the frame of the filter against some sort of seal, e.g., a gel seal. These mechanical fasteners must hold against the airflow pressure that is trying to push the filter away from its seal, and have to maintain the seal integrity. However, once the seal has been compromised, any air leakage, and of course any entrained contaminates, can pass around the filter directly into the clean space.

OBJECTS AND SUMMARY OF THE INVENTION

An object of the present invention is to use airflow pressure to advantage and to eliminate the mechanical fasteners.

Another object is to provide a filter arrangement wherein the more the filter loads up, increasing airflow pressure, the more the airflow pressure maintains the seal.

It is also an object, by eliminating the fastener, to increase the space available for filter media, which increases capacity and efficiency.

A related object is to achieve the maximum size filter possible to fit between ceiling elements, thereby reducing pressure drop and energy losses, and also maximizing airflow.

The invention here concerns a secondary seal, e.g., in the form of a gasket, that both holds the filter in place in the unit and also seals the space between the primary seal (e.g., gel seal) and the clean space. Here, an extruded gasket seats into a peripheral recess in the frame. This can be removed when the filter needs to be changed out so the filter can be dropped out, and a replacement seal installed after the new HEPA filter is in position. The gasket seal is positioned as close as possible to the bottom of the frame, i.e., close to the clean space, so that possible contaminants are prevented from falling into the space below. Units that could include this as an improvement are generally well known and available in the market.

An aspect of this invention can be seen in an overhead airflow filter unit. A replaceable filter member, including a frame and a filter medium supported in the frame, is fitted into a filter housing which includes a peripheral shell dimensioned for the frame to fit into it. The peripheral shell has a bottom wall and an interior side wall facing the frame. The filter frame and the interior side wall of the shell define a peripheral space between them, and this peripheral space stands as a potential leakage pathway around the filter. The filter housing also includes enclosure means atop the shell to define an air plenum above the filter member. The fan or blower that is provided with units of this type, or is connected by ductwork, creates an forward air pressure in the plenum, such that the air in the plenum is at an elevated pressure is forced through the filter medium.

A gel seal or equivalent seal means, typically on the filter frame, cooperates with other structure, such as a depending flange means on the housing, to create a peripheral seal between the plenum and the peripheral space. This constitutes the main barrier against leakage around the filter. This unit also includes removable retaining means for removably holding the frame of said filter member within the shell of the housing, in a way in which the seal means is held against the cooperating structure to make this seal.

In this invention the retaining means comprise a resilient annular retainer member, e.g., a gasket, that biases against said frame of the filter. To accommodate this, there is an annular groove formed on said interior side wall of the peripheral shell and the retainer member or gasket is removably inserted into it. The gasket forms a seal against the lower part of the filter, and seals off the peripheral space around the filter frame. When the filter is to be changed out, the retainer member or gasket can be easily removed by pulling it out of its annular groove. Then the filter can be dropped down out of the housing and replaced with a fresh filter. After this, the gasket can be replaced, or a fresh gasket installed.

The gasket can be shaped to accommodate the particular filter, and can have a support portion that projects down against the interior side wall of the shell. In some cases, the retainer member can be made of a spring metal, and can be caulked after installation to effect a seal.

The above and many other objects, features, and advantages of this invention will be better understood from a consideration of the ensuing detailed description of several preferred embodiments, which are to be read in connection with the accompanying Drawing.

BRIEF DESCRIPTION OF THE DRAWING

FIGS. 2 to 6 illustrate further embodiments of this invention.

FIGS. 7A and 7B show a portion of a filter unit according to a further embodiment.

DETAILED DESCRIPTION OF THE PREFERRED EMBODIMENTS

Figure 1A:
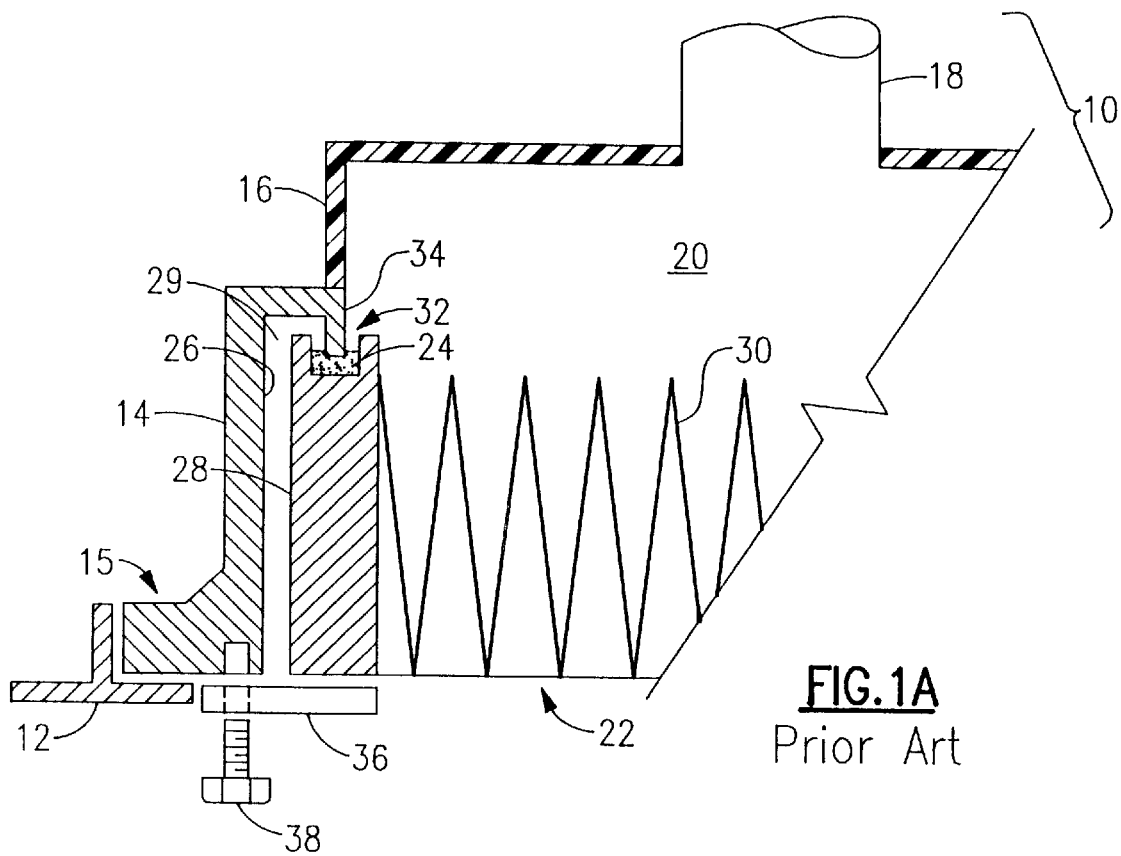
FIG. 1A is a partial sectional view of a filter unit according to the prior art.

With reference to the Drawing, the advantages of this invention can be highlighted by first considering a filter unit of the prior art, as illustrated in FIG. 1A. Here, a typical ceiling-mounted replaceable filter unit 10 is shown supported in a T-frame member 12 of a T-bar suspended ceiling. Here the unit 10 has a housing formed of a rectangular shell 14, with a cover or enclosure 16 atop it. The shell has an outwardly projecting flange 15 that rests on the T-frame member 12. The airflow from the fan or blower (not shown) is ducted through a conduit 18 into a plenum or space 20 within it. A replaceable HEPA filter 22 has a rectangular frame 24 which is shown here positioned within the shell 14. A vertical interior side wall 26 of the shell faces the outer side wall 28 of the frame 24, here defining between them a peripheral space 29. Filter media 30 is supported in the frame 24.

At the top of the frame 24 is a gel seal 32 (or other type of seal), and there is cooperating structure, here a depending female flange 24 on the unit housing and a male flange on the shell 14 that seals off the plenum 20 from the peripheral space 29, so that the air in the plenum passes only through the filter media to remove the particles from the air. To offset the pressure and hold the filter firmly in place against its seal, a mechanical fastener 36 is used. In this illustration, the fastener 36 is a tab or finger, that is held in place by machine screws 38. Here the shell geometry has to extend within the boundaries defined by the T-bar member 12 so as to accommodate the machine screws 38.

This prior art construction has some undesirable consequences. First, vibration from normal operation can loosen the fastener 36 and thus relieve some of the closure force on the seal 32. In the prior art filters, as the air pressure becomes greater, so does the potential for leakage around the filter. Moreover, the fastener 36 does not provide any sealing function itself, and if there is any leakage into the peripheral space 29, that leakage will continue through the space 29, and will carry particulates into the clean space.

Figure 1B:
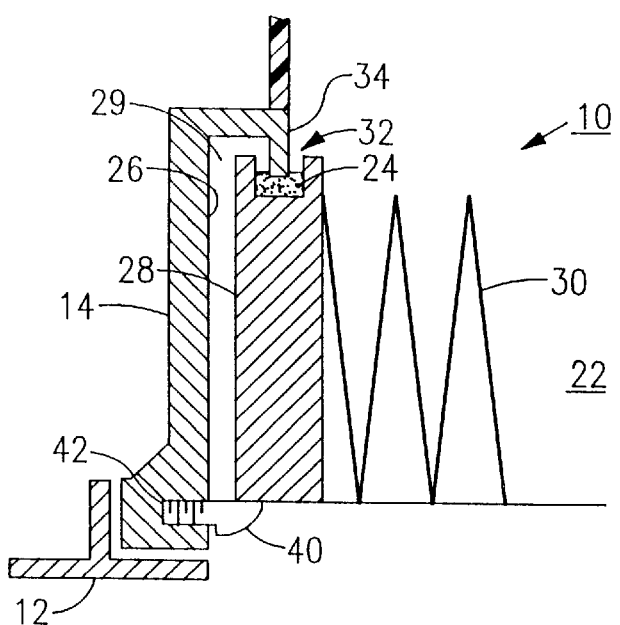
FIG. 1B is a partial sectional view of a filter unit according to one embodiment of this invention.

An embodiment of this invention is illustrated in FIG. 1B, in which elements that are identical with corresponding elements in FIG. 1A are identified with the same reference numbers, and where other corresponding elements not identical carry a prime. Here, the filter unit 10' has its shell 14' positioned directly over the T-frame member 12, and side wall 26 is flush with the edge of the T-frame member 12, as the fastener 36 and machine screw 38 of the prior art are not used. The filter frame 24 and 14 and gel seal 32 have the same function and construction as before. In this embodiment an extruded gasket 40 is employed to hold the frame 24 of the filter media element, so the usual mechanical fastener is eliminated. This allows the filter area to be increased on all four sides (as indicated here for one side). Also, the extruded gasket member seals in the peripheral space 29 alongside the filter within the shell, to prevent contaminants in that space from entering the clean space. In this case the shell 14' has an annular channel or groove 42 formed near the base of the interior side wall 26, and the gasket 40 is formed with an outer flange that fits securely into the groove 42. The gasket has a shaped head portion 44 that presses against the base or bottom wall of the filter frame 24, and in this case has a portion that projects down a short distance along the shell interior side wall 26 below the groove 42.

The gasket 40 can be removed from the groove 42 when the time comes to replace the filter 22. The filter then can drop straight down, and a fresh filter can be placed back into the same space in the shell 14'. Then the gasket 40 is then replaced in the groove 42. No special tools are required for this. It is clear that the gasket, which can be made of an elastomeric material, e.g., silicone rubber, will not come loose from vibration. Also, the gasket 40 creates a seal at or near the bottom of the filter frame, and protects the clean space from bypass air and/or other contamination in space 29.

In this arrangement, the pressure created by the airflow presses the filter frame against a gasket or seal which is wedged between the filter frame and the shell. The greater the pressure drop caused by the filter loading, the greater the pressure against the gasket, and therefore the better the seal. To remove the filter, the fans are shut off, stopping the airflow pressure. Then the filter is pushed up slightly, and the gasket is removed from its groove or channel. The filter then drops out by gravity, and a new filter can be installed. The existing gasket can be reused, or a new or replacement gasket can be installed. Various types and shapes of gasket extrusion can be used. Ideally, the gasket can be made so tight and reliable that the main or primary seal can be eliminated. However, both the primary seal and the gasket seal, i.e., redundant resealing, would normally be used to obtain increased reliability. For extreme high reliability, a vacuum could be pulled in space 29.

An additional benefit of this invention is that the gasket seals in any dust or dirt that may exist in the space between the primary seal and the room or clean space. This may be especially important in medical or pharmaceutical applications where it is necessary to contain or clean all surfaces downstream of the filter and its seal.

As shown here, the gasket 40 can be extruded elastomeric material. This can be made with or without an embedded support. This gasket can be shaped so as to have a flange that fits into a recess in the frame, such as the groove shown here, which can have a tooth structure to retain the gasket. However, the embodiment as shown in FIG. 1A is but one of many possible embodiments, and other possible embodiments are illustrated and described below.

FIG. 2 illustrates another embodiment, in which structure that corresponds to elements in the previous embodiment are identified with the same reference numbers. Where there is some structural difference, a double-prime has been added. Here, another version of the filter frame 24" has the gel seal 32" situated at the bottom, so as to minimize the distance between the seal and the clean space below. In this case, the foot of the shell 14" has a gasket member 43 disposed between it and the T-bar member 12. This gasket 43 can be present in other embodiments as well. In this embodiment, the gasket seal 40 biases against the base of the gel seal structure 32".

FIG. 3 shows another variation, in which structure introduced above is identified with the same reference numbers, but raised by 100. Here, the gasket 140 has a circular cross-section that biases against a tapered or chamfered surface of the frame 124. The gasket 140 is retained in the channel or groove 142 in the shell 114. FIG. 4 shows yet another version, where corresponding structure has the same reference numbers as above, but raised by 200. Here, the gasket seal 240 is incorporated into the shell 214 above a gel seal 213, the latter being incorporated into the T-frame member 212. In this version, T-frame gel seal 213 replaces the gasket 43, for example, as was described just above. In the further variations as shown in FIGS. 5 and 6, the extruded gasket seal 340 can be shaped to hook into a recess on the frame 324 (FIG. 5) or the gasket seal 540 can have a tapered side to engage a chamfered edge of the frame 424 (FIG. 6). FIGS. 7A and 7B show other embodiments in which metal springs or clips 540 or 640 serve the retaining role of the gasket seal, each having a retaining portion that fits into the groove or channel 42, and a portion that supports the base of the filter frame 24. Here, a bead of caulk 543 or 643 is applied to seal the filter frame and the housing. As an alternative, the spring member 540 or 640 can optionally be incorporated into the elastomer gasket 40 as reinforcement.

In each of these cases, gravity and air pressure work together to press the filter against the sealing gasket. No screws, springs or clamps are used to bias the filter or frame down against the gasket. The gasket can be removed and replaced without need for special tools. The gasket seal also closes up small spaces that may otherwise be repositories for particles and thus permits cleaner running.

This invention has been described with reference to certain illustrative embodiments. However, the invention is not limited to the foregoing embodiments. For example, although the embodiments described above are overhead ceiling-mounted units, the invention is certainly applicable to units other than overhead units and other than ceiling-mounted units, for example, wall units or free-standing units. Rather many modifications and variations thereof would present themselves to persons of skill in the art without departure from the scope and spirit of this invention, as defined in the appended claims.

I claim:

1. An airflow filter unit comprising:
   a replaceable filter member which includes a frame that defines a periphery of said filter member and a filter medium supported in said frame;
   a housing which includes a peripheral shell dimensioned to surround said frame and having a bottom wall and an interior side wall facing said frame to define a peripheral space between the interior side wall and the frame, and enclosure means atop said shell defining an air plenum above said filter member wherein air in said plenum is at an elevated pressure to force air through said filter medium;
   seal means on said frame cooperating with a depending flange means on said housing to create a peripheral seal between said plenum and said peripheral space; and
   removable retaining means for removably holding the frame of said filter member in said shell of said housing with said seal means against said cooperating flange;
   wherein said retaining means includes a resilient annular retainer member for biasing against said frame, and an annular groove formed on said interior side wall of said peripheral shell and into which said retainer member is removably inserted.

2. Filter unit according to claim 1, wherein said resilient annular retainer member includes an elastomeric ring gasket having an outer side to fit into said groove and an inner side dimensioned to fit against a bottom wall of said frame.

3. Filter unit according to claim 1, wherein said elastomeric ring gasket has a round profile which is compressed by said frame to form a seal.

4. Filter unit according to claim 3, wherein said frame has a chamfered lower surface against which said ring member is biased.

5. Filter unit according to claim 3, wherein said elastomeric ring member has a depending portion that extends downward against the interior side wall below said groove.

6. Filter unit according to claim 1, wherein said resilient annular retainer member includes a metal spring member having an outer side to fit into said groove and an inner side dimensioned to fit against said frame.

7. Filter unit according to claim 6, wherein a bead of caulk is applied over said metal spring member to seal between said frame and said peripheral shell.

8. An airflow filter unit comprising:
   a replaceable filter member which includes a frame that defines a periphery of said filter member and a filter medium supported in said frame;
   a housing which includes a peripheral shell dimensioned to surround said frame and having a bottom wall and an interior side wall facing said frame to define a peripheral space between the interior side wall and the frame, and enclosure means atop said shell defining an air plenum above said filter member wherein air in said plenum is at an elevated pressure to force air through said filter medium; and
   removable retaining means for removably holding the frame of said filter member in said shell of said housing to seal against air and any entrained particulates from escaping through the peripheral space between the filter frame and the shell of the housing;
   wherein said retaining means includes a resilient annular retainer member for biasing against said frame, and an annular groove formed on said interior side wall of said peripheral shell and into which said retainer member is removably inserted.

9. Filter unit according to claim 8, wherein said resilient annular retainer member includes an elastomeric ring gasket having an outer side to fit into said groove and an inner side dimensioned to fit against a bottom wall of said frame.

10. Filter unit according to claim 8, wherein said resilient annular retainer member includes a metal spring member having an outer side to fit into said groove and an inner side dimensioned to fit against said frame.

11. Filter unit according to claim 10, wherein a bead of caulk is applied over said metal spring member to seal between said frame and said peripheral shell.

* * * * *